E. C. RUSSELL.
STARTING DEVICE FOR MOTOR VEHICLES.
APPLICATION FILED MAY 28, 1914.
1,155,511.
Patented Oct. 5, 1915.
2 SHEETS—SHEET 1.
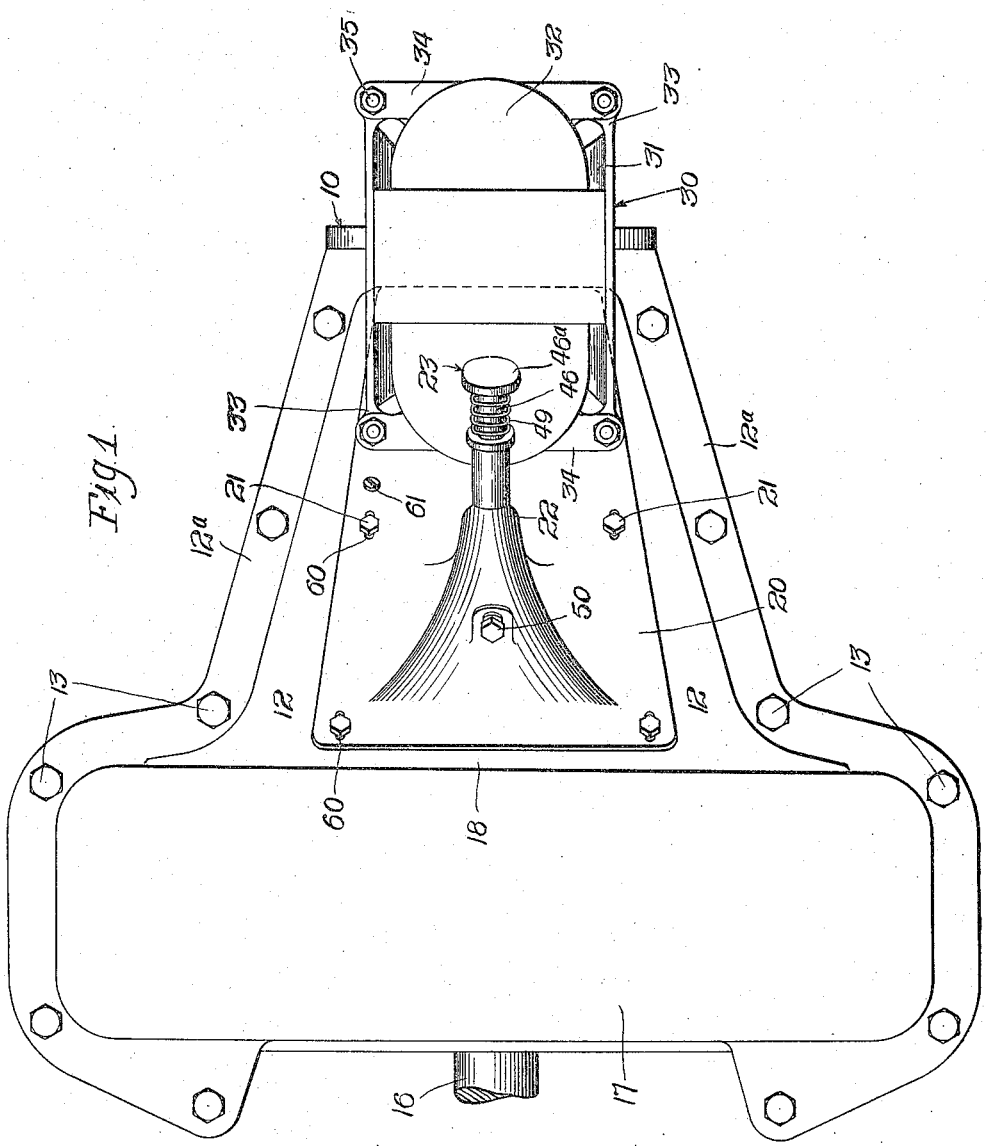
Witnesses:
Harry S. Gaither
Charles H. Poole
Inventor
Emerson C. Russell
by Poole & Crouser
Attys.

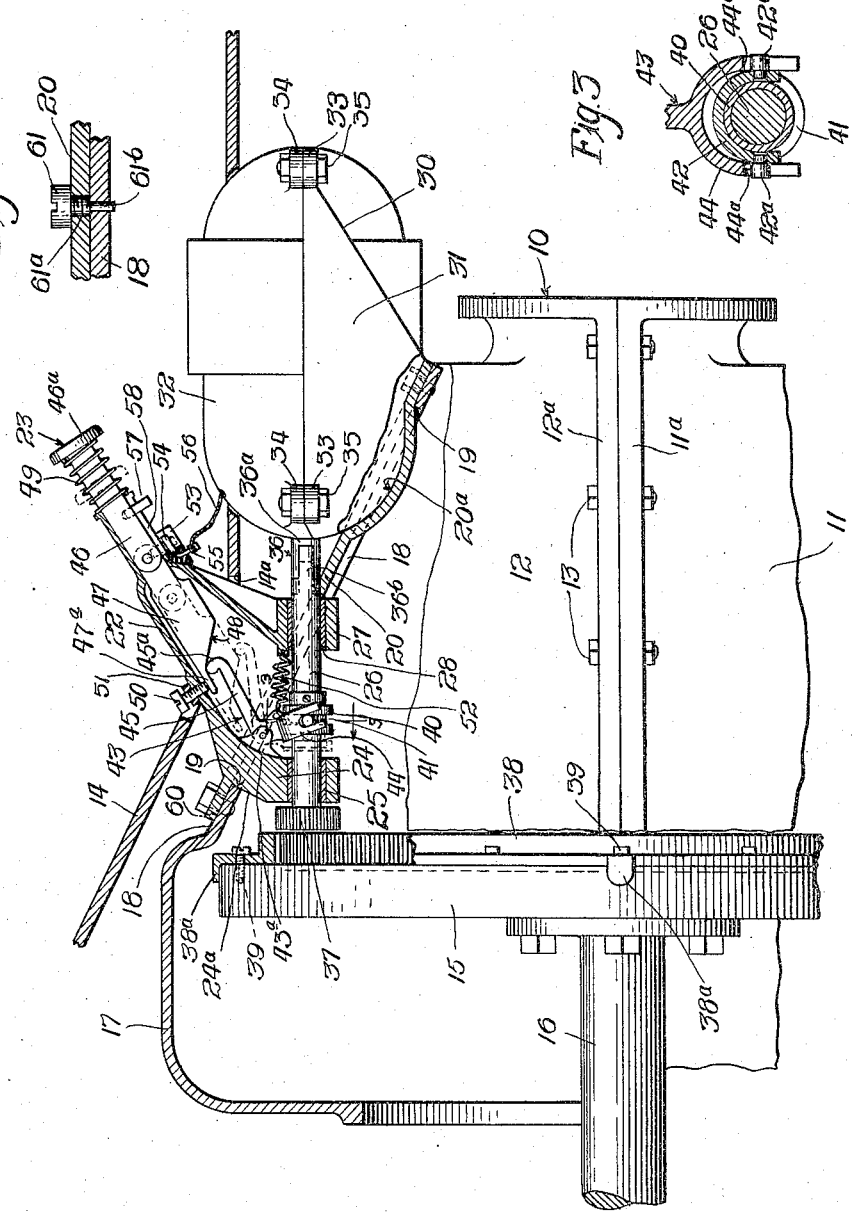

UNITED STATES PATENT OFFICE.

EMERSON C. RUSSELL, OF CHICAGO, ILLINOIS.

STARTING DEVICE FOR MOTOR-VEHICLES.

1,155,511. Specification of Letters Patent. Patented Oct. 5, 1915.

Application filed May 28, 1914. Serial No. 841,434.

*To all whom it may concern:*

Be it known that I, EMERSON C. RUSSELL, a citizen of the United States, and a resident of Chicago, in the county of Cook and State of Illinois, have invented certain new and useful Improvements in Starting Devices for Motor-Vehicles; and I do hereby declare that the following is a full, clear, and exact description thereof, reference being had to the accompanying drawings, and to the letters of reference marked thereon, which form a part of this specification.

This invention relates to improvements in starting devices for explosive or internal combustion engines, and more particularly to starting devices that are operated by an electric motor and are adapted for use in connection with the engines of automobiles and like power driven vehicles.

Among the objects of my invention are to provide an electric starting device that is compact and simple in construction and certain in operation, that may be easily controlled by the operator, and is adapted to be applied or attached to engines of the kinds or types heretofore in common use, without requiring any changes to be made in such engines.

My invention herein described and shown as applied to the engine of that type of motor vehicle known as the "Ford" although it may be applied to other makes of motor vehicles having similar features of construction.

My invention consists therefore in the matters hereinafter set forth and more specifically pointed out in the appended claims.

As illustrated in the accompanying drawings, Figure 1 is a top plan view of the transmission cover and starting device; Fig. 2 is a view in longitudinal section of a transmission cover or casing and of my starting device mounted thereon; Fig. 3 is an enlarged detail view taken on line 3—3 of Fig. 2; and Fig. 4 is a detail view showing a form of set screw employed in securing the starting device in place.

The parts of a motor vehicle shown in the accompanying drawings include a gear casing 10, which surrounds the engine fly-wheel 15 and transmission gearing of the vehicle. As illustrated, the said casing 10 corresponds in form with that used in the type of motor vehicle known as the "Ford." Said gear casing 10 comprises a lower casing member 11, preferably made integral with and forming a rearward extension of the crank case of the motor, and an upper portion or cover 12. Said cover 12 is removably attached to the lower casing member 11 and is secured to the same along its horizontal lateral margins, said margins lying substantially in a horizontal plane passing through the longitudinal axis of the casing. The joints between the margins of the cover 12 and the lower casing member 11 are formed by means of flanges 11$^a$ and 12$^a$ on said parts, through which extend bolts or screws 13. In its larger, forward part 17, which covers the fly-wheel 15, the cover 12 is semi-circular in form, and the walls of said cover are tapered or inclined from its larger, or forward, to its smaller rear end. The gear casing 10 is situated immediately beneath the floor 14 of the car and forward of the driver's seat. The fly-wheel 15 is mounted upon the crank shaft 16 in the usual manner.

In the top of the cover 12, the inclined or tapered portion thereof is made flat, so as to form a flat, inclined wall-section 18, extending from the rear margin of the enlarged forward part 17 of the cover rearwardly and downwardly to the rear end thereof. In this flat wall-section 18 is provided an opening 19, which forms a hand-hole, by which access may be had to the transmission gearing. This opening 19 is tapered to conform to the shape of the cover 12, as seen in plan view; that is to say, its lateral margins converge or taper from front to rear and its lower or rear margin being shorter than its forward or upper margin. This opening or "hand-hole" is situated below a portion of the floor of the vehicle, ordinarily serving as a foot rest for the driver, which is usually made removable for the purpose of gaining access to the mechanism immediately below the same.

In the usual construction of vehicles having a gear-casing made as illustrated, this hand-hole 19 is covered by a flat plate of substantially the same shape as that of the hole, arranged to overlap at its margins, and secured to the cover by means of a plurality of cap screws, and in such manner that it can be easily removed by a convenient tool, so that access may be had therethrough to the mechanism within the transmission casing, for the purpose of repairs or adjustment.

A starting device made in accordance with my invention is provided with a base or supporting frame member, having the same general dimensions as that of the hand-hole plate, and which may be substituted for such hand-hole plate, as a cover or closure for the hand-hole, thus making it possible to attach the starting device to a vehicle already in use, and to equip new vehicles with starting devices without necessitating a departure from the standard design or construction of the vehicle.

Referring now to the features of construction of the starting device, the same embodies parts as follows: The base plate or supporting member 20 is adapted to fit at its margins the edges of the opening or hand-hole 19, said plate having the same shape as that of the hand-hole, and being adapted to engage in overlapping relation the margins of said hand-hole. A plurality of cap screws 21 extend through holes formed in the marginal portions of the base plate 20, and engage screw-threaded apertures in the margins of the cover 12, which surrounds said hand-hole.

Integral with the base plate 20 at the forward part of the same is a hollow casing 22 located at the central portion thereof, the interior of said casing opening directly into the transmission casing and forming in effect a portion of the same. The casing 22 projects upwardly and rearwardly from the base plate and is tapered as it approaches its upper extremity where it assumes the shape of a cylindric tube. The upper part of said casing 22 is designed to extend through an aperture 14ª formed in the floor 14 of the vehicle and within convenient reach of the operator's foot. This casing supports an endwise movable operating plunger 23 hereinafter to be described in detail.

Projecting downwardly from under the surface of the base plate 20 is a bearing, lug or arm 24, preferably formed integral with said plate and located at the forward end thereof immediately adjacent to the forward wall of the plunger casing 22. The upper portion of the bearing arm 24 is perpendicular to the base plate and forms a shoulder 24ª adapted to engage the adjacent margin of the opening or hand-hole 19 for the purpose of aiding in the proper placement of the base plate. The lower portion of the bearing arm is inclined relatively to its upper portion, and is at right angles to the axis of the driving shaft. Through said lower portion of the bearing arm extends a horizontal bore, forming a bearing for the forward end of the shaft 26 of the starting mechanism. The bearing arm is shown as provided with a bushing 25. In horizontal alinement with the bearing formed by the arm 24, and rearwardly thereof, is another bearing 27. This bearing has the form of a short tube or sleeve, made integral with the base plate, and extending horizontally through said base plate obliquely with relation to the plane of said plate. The forward end of the bearing-sleeve 27 terminates at the lower end of the rear wall of the plunger casing 22, and is joined integrally to the lower margin of said rear wall. This bearing-sleeve 27 is also provided with a bushing 28, and supports the rear end of the starter shaft 26; it being noted that the bearing aperture in said sleeve forms an opening in the base plate 20, through which the starter shaft extends in passing from the interior of the transmission casing to the exterior thereof.

At the rear portion of the base plate 20 is provided a motor supporting frame 30, comprising two laterally and upwardly inclined webs 31, preferably formed integral with said base plate and between which is mounted the electric motor 32. The rear portions of the webs 31 project rearwardly beyond the rear end of the base plate 20, and at their rear extremities and forward extremities are provided with lugs 33 adapted to engage the lugs or arms 34 on the sides of the motor 32. A bolt 35 extends through each pair of engaging lugs whereby the motor is rigidly secured in place. The motor is mounted between the webs 31 in such manner that the armature shaft is in longitudinal alinement with the shafts 26. A depression 20ª is formed in the base plate 20 to give room for the forward end of the motor. The armature shaft projects from the motor at its forward end and is directly connected in driving engagement with the shaft 26 by means of a shaft coupling 36 adapted to afford relative endwise movement between the starter shaft and armature shaft. Said coupling 36 comprises a bifurcated member 36ª mounted upon the armature shaft, and a tongue member 36ᵇ adapted to fit loosely within the space between the arms of the said bifurcated member. The purpose of providing such a joint between the motor and starter shafts is to permit endwise movement of said shaft without disconnecting the same from the shaft.

At the forward end of the shaft 26, and adjacent to the fly-wheel 15, is rigidly mounted a spur gear-wheel or pinion 37, adapted to rotate with the shaft 32 and to move endwise therewith. This pinion is adapted to mesh with an annular gear or ring 38 provided with gear teeth, and rigidly secured to the rear surface of the fly-wheel, adjacent to the periphery thereof. Said ring is provided with a plurality of radially extending fingers or arms 38ª, adapted to extend over and engage the peripheral surface of said fly-wheel, and thereby acting to afford the proper concentric position of the ring 38 upon the fly-wheel.

The said ring is secured to the fly-wheel by means of screws 39 extending through the ring exterior to the gear teeth and anchored in the fly-wheel.

Referring to the mechanism employed to impart an endwise movement to said shaft 26, the same may be understood from the following:—Upon the starter shaft 26 is rigidly mounted a collar 40 (Figs. 2 and 3), located intermediate the ends of said shaft and between the bearings 24 and 27. The collar 40 is provided with an annular groove 41 within which is located a U-shaped yoke member 42 which extends around the uppermost portion of said collar 40. Said yoke member 42 is provided with rigid, laterally extending pins or studs 42$^a$, 42$^a$, the axes of said pins being horizontal in alinement with the axis of the shaft 26. The yoke member 42 has operative connection with a shifting lever 43 which has connection with the base plate 20. Said shifting, as shown, has the form of a bell crank lever, comprising two arms 44 and 45 arranged substantially at right angles to each other. The arm 44 of the lever 43 is U-shaped and embraces the yoke member 42, the ends of said U-shaped arm 44 being bifurcated to form slots 44$^a$, 44$^a$ adapted to receive the pins 42$^a$ of said yoke member 42. The lever 43 is pivoted at the intersection of the arms 44 and 45 thereof to a lug 43$^a$ integral with the base plate and located at the base of the forward wall of the plunger casing 22. The arm 45 of the lever 43 extends upwardly and rearwardly into the plunger casing and is provided at its end with a rounded head 45$^a$ adapted to have constant sliding contact with the plunger 23. The plunger 23 comprises two pivotally connected members 46 and 47, the member 46 being cylindric in form and adapted to fit and slide endwise within the upper tubular end portion of the plunger casing. The other member 47 of the plunger is pivotally connected by a horizontal, transverse pivot to the lower or inner end of the member 46 and projects into the space formed within the lower part of the plunger casing. Said member 47 is preferably in the form of a block, rectangular in cross-section, and provided at its lower or swinging end with an oblique or cam surface 48, said cam surface being inclined to the path of movement of the plunger and sloping from the upper surface of the member to the lower surface. At the point of intersection of the oblique end surface and the upper surface of the member 47, is provided a flat arm or projection 47$^a$, extending from the lower end of said member adjacent to the top or forward wall of the casing 22; the under surface of said projection 47$^a$ and the cam surface of the member 47 being joined by a slightly curved surface or fillet. The said oblique surface 48, the under surface of the projection 47$^a$ and the lower or downwardly facing surface of the member 47 form contact or cam surfaces for the arm 45, as will hereinafter be pointed out.

Referring further to the cylindric member 46 of the plunger, the same projects at its upper end beyond or outside of the plunger casing and is provided at such upper end with a flat head 46$^a$ adapted to receive the pressure of the operator's foot in the operation of the starting device. Between this head 46$^a$ and the upper end surface of the plunger casing is mounted a coiled spring 49, which surrounds the end portion of the plunger member 46, said spring acting to force the plunger outwardly or upwardly when the pressure upon the plunger is released.

At the base of the front wall of the plunger casing 22 is provided a set screw 50 which has screw-threaded engagement with said casing immediately above the plunger member 47. This set screw projects through the wall of the casing and engages the upper surface of said member and of the projection 47$^a$ thereof. This set screw is adapted to be adjusted inwardly and outwardly and forms an adjustable stop which holds the member 47 from swinging upwardly about its point of pivotal connection with the cylindric member 46, and acts to maintain said member in the desired position of adjustment, there being provided a lock nut 51 upon the stem of said set screw for the purpose of securing the set screw from movement when the desired adjustment has been obtained.

The head 45$^a$ of the lever arm 45 is adapted to constantly coact with the plunger member 47 and, in order to insure the positive contact of these members, a coiled spring 52 is employed, which is secured at one end to the arm 44 of the lever 43, immediately below its point of pivotal connection with the casing, and extends in a horizontal direction substantially parallel with the shaft 26, and is connected at its other end to the opposite side of the plunger casing adjacent to the inner end of the bearing 27. This spring performs a double function, namely to maintain the arm 45 in constant contact with the plunger and to withdraw the bevel gear 37 from the annular gear upon the fly-wheel, when the pressure upon the plunger 23 is released.

The operation of the members of the starting device thus far described may be described as follows: As shown in full lines in Fig. 2, the members of the device are in their non-operative position, the shaft being shifted in a direction away from the fly-wheel so that the pinion 37 is disengaged from the annular gear 38 of said fly-wheel. The plunger 23 is at this time at the outer extremity of its movement, being moved and maintained in that position by the expansive action of the coiled spring 49. The lever 43, by means of which the movement of the plunger is transmitted to the shaft, is at this time held by the spring 52 in position with its head 45ª on the lever arm 45 in contact with the forward portion of the oblique end surface 48 of the plunger member 47, and adjacent to the projection 47ª of said plunger. The several members are now in position to be actuated for the purpose of throwing the said gears into mesh. This operation is accomplished by exerting a downward pressure upon the head 46ª of the plunger 23, whereby said plunger is forced downwardly. This movement of the plunger acts to oscillate the lever 43, by reason of the contact of said lever arm 45 with the oblique surface 48 of the plunger member 47. The oscillatory movement of the lever is transmitted to the shaft 26 through the medium of the U-shaped arm 44, the yoke member 42 and collar 40 acting to transform the oscillatory motion of the lever into a linear motion acting to shift said shaft endwise to effect the intermeshing of the pinion 37 with the annular gear 38 of the fly-wheel. When the gears are fully engaged, the head 45ª of the lever arm has passed beyond the lower margin of the oblique surface 48 and rests in contact with the lower longitudinal surface of the plunger member. This contact of the lever and the plunger acts to maintain the gears positively in mesh, by reason of the fact that any force or jar exerted upon the shaft or other members of the device, with the exception of the plunger will be necessarily resisted by the contact of the head of the lever arm with the flat horizontal surface of the plunger. The positive engagement of the starting device and the motor will be maintained so long as the operator continues to exert downward pressure upon the plunger. The release of the pressure upon the plunger results in the immediate return of the parts to their original positions, such return movement being automatically effected by means of the springs 49 and 50 in the manner before stated.

In addition to the parts already described, I provide means for starting the electric motor immediately after the gears have been thrown into mesh, whereby the starter shaft is rotated and a rotative movement transmitted to the fly-wheel and crank-shaft until the engine starts in operation. This device consists of a switch 53 which is operated by the movement of the plunger and acts to close the circuit between the motor and a source of electrical energy, preferably in the form of a storage battery carried by the vehicle. The switch 53 is mounted upon the under side or surface of the plunger casing and at the base of the tubular portion thereof, said switch consisting of a block in which are mounted two contact pieces 54, 54 spaced apart and properly insulated from each other. These contact pieces 54, 54 project in the direction of the end of the plunger and are further connected by suitable wires to terminals or binding posts 55, to which are connected the conductors 56, leading to the motor. From the under side of the plunger member 46, projects a pin 57, which extends through a longitudinal slot 58 in the tubular portion of the plunger casing. This pin is so located upon the plunger that when the latter is in its non-operative position, the pin is at a distance from the switch block 53, and when the plunger is pressed downwardly the pin enters the space between the contact pieces and affords electrical connection between said pieces, thus starting the motor. The relative location of the switch block and pin is such that the starting of the electric motor occurs immediately after the pinion on the starter shaft has been thrown into engagement with the annular gear 38 on the fly-wheel. The power of the motor is positively transmitted to the shaft 26 by means of the sliding shaft connection, which permits the shaft to be shifted endwise without interfering with said positive transmission of rotary motion from the motor to the shaft.

It is to be understood that a starting device made in accordance with the features herein set forth is adapted to be attached to any form of motor vehicle having a fly-wheel and gear casing arranged in the general relation shown. It is to be further understood, however, that, although vehicles are designed and manufactured which are identical in every detail of construction, it is nevertheless true that slight variations frequently exist, as for instance, in the case of new and old vehicles, due to greater wear on the parts of the latter than on the former, or in the case of new vehicles a slight variation in the thickness of metal which would tend to vary the slight relative positions of the moving and stationary parts in different vehicles. For this reason, it is necessary to provide means whereby slight adjustments may be made in the starting device, so that the device may be attached to different vehicles of the same make and any slight discrepancies overcome. It is for this reason that the set screw 50 is employed for adjusting the operative position of the plunger member 47. The adjustment of the set screw 50 acts to swing the pivoted plunger member 47 relatively to the cylindric plunger member 46, and likewise to change the position of the lever 43, so as to determine the endwise position of the shaft 26, when shifted toward the fly-wheel 15. By the use of said set screw, therefore, any degree of variation in the relative positions of the coacting parts is overcome and the proper engagement of the gearing is assured. Furthermore, to insure the proper placement of the base plate 20 upon the transmission cover 12, I make the bolt holes, as shown at 60, Fig. 2, elongated in the direction of the center line of the base plate 20, thereby permitting said base plate to be adjusted longitudinally in order to compensate for any slight variations in the dimensions between different vehicles to which my device is applied.

In attaching my starting device to a particular vehicle having a gear casing made as illustrated, the annular gear wheel 38 is secured to the fly-wheel in the manner before stated, the fingers or projections 38ª acting to properly locate the gear wheel in concentric relation to the fly-wheel. The handhole plate usually employed to close the opening 18 in the gear-case cover, is removed and the base plate of the starting device fitted upon the gear casing in the same position as the removed hand-hole plate. The starting device is then adjusted, if necessary, by means of the elongated bolt holes 60 and the set screw 50, so as to bring the pinion 37 accurately in position in relation to the annular gear 38 of the fly-wheel. For the purpose of retaining the starting device rigidly in position after being properly placed, I provide in the base plate 20 a set screw 61 (Fig. 4) provided with a screw-threaded portion 61ª adjacent to its head and a projection or dowel pin 61ᵇ below said threaded portion. This set screw has threaded engagement with the base plate 20 adjacent to its margin, and is removed therefrom during the operation of adjusting the starting device. The final operation is to drill or tap a hole through the wall of the gear-case, in line with the threaded hole in the base plate, of substantially the same diameter as that of the dowel pin 61ᵇ. The set screw is then placed in position and tightened; the dowel pin engaging the hole in the gear-case. In this manner liability of longitudinal movement of the base plate, by reason of the elongated form of the bolt hole employed, is prevented, and furthermore the set screw 61 acts to determine the proper position of the starting device in replacing the same, whenever the starting device is removed for the purpose of giving access to the interior of the gear casing or for making repairs.

A starting device, constructed in accordance with my invention and adapted to be applied to a motor in the manner set forth, possesses a number of advantageous features, as regards location, manner of attachment, and operation. The device is immediately adjacent to the point where the power is to be applied, and of easy access from the driver's seat; it is located upon the upper surface of the gear-casing and close to the crank shaft and transmission gears, and for that reason is not subject to contact with dirt and grease that is ordinarily present in the lower portion of the gear-casing. A further feature of the device is the ease with which the device may be attached to the vehicle, there being required no especially formed supports or attachments and no alteration in the mechanism of the engine. The device becomes in effect an integral part of the casing for the transmission gear, and, in view of the fact that the movable parts of the device are located entirely within such casing, and the plunger-casing of the device communicates directly with said gear-casing, the operative parts are adapted to receive lubricant introduced into the said casing in the same manner as provided for the other portions of mechanism located within such casing. No independent means of lubrication is therefore required, and no attention need be given to the oiling or lubrication of the device.

While the device embodying my invention is particularly adapted for use in connection with a "Ford" automobile, it is to be understood that it may be variously modified in its details of construction without departing from the spirit of the invention. For these reasons, my invention is not limited to the particular features of construction shown and described, except so far as pointed out in the appended claims.

I claim as my invention:

1. The combination with an engine fly-wheel and a gear casing provided with an aperture in its side wall, of a base-plate secured to the casing over said aperture, and provided with bearings, a shaft supported in said bearings and operatively connected at one end with said engine flywheel, and a rotative member in driving connection with said shaft at its opposite end.

2. The combination with an engine flywheel and a gear casing provided with an aperture in its side wall, of a base-plate secured to the casing over said aperture, a shaft mounted on said base-plate and extending through the same, a pinion on one end of said shaft having driving connection with said flywheel, and a rotative member operatively connected with the opposite end of said shaft exterior of the casing.

3. The combination with an engine flywheel and a gear casing provided with an aperture in its side wall, of a base-plate secured to the casing over said aperture, an endwise movable shaft mounted on said base-plate and extending through the same, said shaft having driving connection at one end with said flywheel, a motor having driving connection with the opposite end of said shaft, and means for giving endwise movement to said shaft.

4. The combination with an engine flywheel and a gear casing provided with an aperture in its side wall, of a base-plate secured to the casing over said aperture, an endwise movable shaft mounted on said base-plate and extending through the same, said shaft having driving connection at one end with said flywheel, a motor having driving connection with the opposite end of said shaft, and an endwise movable plunger operatively connected with said shaft and adapted to be operated to transmit endwise movement thereto.

5. The combination with an engine flywheel provided with a gear-ring and a gear casing provided with an aperture in its side wall, of a starting device, comprising a baseplate secured to the casing over said aperture, an endwise movable shaft mounted on said base-plate and extending through the same, a pinion on the end of said shaft inside of the base-plate, a motor mounted on the outer face of the base-plate, and having driving connection with the outer end of said starter shaft, and means for giving endwise shifting motion to said starter shaft.

6. The combination with a fly-wheel provided with a gear-ring and a casing for said fly-wheel provided with an aperture in its side wall, of a starting device, comprising a base-plate secured to the casing over said aperture, an endwise movable shaft mounted on said base-plate, and extending through the same, a pinion on the end of said shaft inside of the base-plate, a motor mounted on the outer face of the base-plate, and having driving connection with the outer end of said starter shaft, a spring applied to hold said shaft in its inoperative position, and means operable by the driver acting against the said spring to shift said starter shaft into its operative position.

7. The combination with a fly-wheel provided with a gear-ring and a casing for said fly-wheel, having a larger part which surrounds the fly-wheel and a portion of the wall of which is inclined from the margin of the fly-wheel inwardly toward the axis of said fly-wheel and is provided with an aperture forming a hand-hole, of a starting device, comprising a base-plate secured to the casing at the margins of said aperture, an endwise movable shaft mounted on said base-plate, and extending through the same, a pinion attached to the end of said shaft inside of the base-plate, and adapted to intermesh with the gear-ring on the fly-wheel, a motor mounted on the outer face of the base-plate, and having driving connection with the outer end of said starter shaft, and means for giving endwise shifting motion to said starter shaft.

8. In a starting device, the combination with an engine crank-shaft, of a gear-ring carried by the said shaft, an endwise movable starter shaft arranged parallel with the axis of the crank-shaft, and provided with a pinion, a motor applied to rotate said starter shaft, an oscillating lever connected with the starter shaft, and an endwise movable plunger adapted to act on said lever to give oscillatory movement to the latter in the endwise movement of the plunger.

9. In a starting device, the combination with an engine crank-shaft, of a gear-ring carried by the said shaft, an endwise movable starter shaft provided with a pinion, an electric motor, the armature shaft of which is in alinement with said starter shaft, and is connected with the same by an endwise sliding coupling, an oscillating lever connected with the starter shaft, an endwise movable plunger adapted to act on said lever to give oscillatory movement to the latter in the endwise movement of the plunger.

10. In a starting device, the combination with an engine crank-shaft, of a gear-ring carried by the said shaft, an endwise movable starter shaft provided with a pinion, a motor applied to rotate said starter shaft, an oscillating lever connected with the starter shaft, and an endwise movable plunger provided with a cam surface adapted to act on said lever in the endwise movement of the plunger to advance the starter shaft and with a longitudinal surface adapted to engage said lever when the plunger is in its advanced position.

11. In a starting device, the combination with an engine shaft, of a gear-ring carried by said shaft, a base-plate, an endwise movable starter shaft mounted on said baseplate, a pinion affixed to said starter shaft, a motor mounted on said base-plate, and having operative connection with said starter shaft, an oscillating lever pivoted to the base-plate, and connected with the starter shaft, an endwise movable plunger mounted on the base-plate, and acting on said lever, a spring applied to retract the starter shaft, and a spring applied to retract the plunger.

12. In a starting device, the combination with an engine shaft, of a gear-ring carried by said shaft, a base-plate, an endwise movable starter shaft mounted on said baseplate, a pinion affixed to said starter shaft, a motor applied to give rotary motion to said starter shaft, an oscillating lever pivoted to the base-plate, an endwise movable plunger mounted to slide on the base-plate, and provided with a cam surface acting on the said lever in the advance movement of the plunger, a spring acting on said lever in a direction to retract the starter shaft, and a spring applied to retract the plunger.

13. In a starting device, the combination with an engine shaft, of a gear-ring carried by said shaft, a base-plate arranged in angular relation to the engine shaft, an endwise movable starter shaft mounted on said base-plate in position parallel with the engine shaft, and extending through said plate, a pinion affixed to the inner end of said starter shaft, a motor attached to the plate, and having operative connection with the outer end of said starter shaft, an oscillating lever pivoted to the base-plate, and engaging the starter shaft, and an endwise movable plunger mounted to slide on the base-plate, and provided with a cam surface adapted to act on said lever.

14. A starting device, embracing a rotative and endwise movable starter shaft, and means for advancing the starter shaft, embracing an oscillating lever, an endwise movable plunger, a plunger section pivoted to the inner end of said plunger and provided with a cam surface adapted to act on said lever, and an adjustable stop, acting laterally on the pivoted plunger section, to hold the cam surface of the latter in desired operative relation to the said lever.

15. A starting device, embracing a rotative and endwise movable starter shaft, and means for advancing the starter shaft, embracing an oscillating lever, an endwise movable plunger, a plunger section pivoted to the inner end of said plunger and provided with a cam surface acting on the lever in the advance movement of the plunger, and with a longitudinal surface acting to hold the lever in the position to which it is shifted by the action of said cam surface, and an adjustable stop, acting laterally on the pivoted plunger section, to hold the latter in operative relation to the said lever.

16. A starting device, embracing a base-plate provided with a hollow casing, a rotative and endwise movable starter shaft mounted on said base-plate, an oscillating lever, mounted on the base-plate, with one of its arms engaging the starter shaft and its other arm extending into said hollow casing, an endwise movable plunger mounted to slide in the outer end of said hollow casing, a plunger section pivoted to the inner end of said plunger, and provided with a cam surface adapted to act on said lever, and an adjustable stop inserted through the wall of said hollow casing, and adapted to act laterally on the pivoted plunger section.

17. A starting device, comprising a base-plate, an endwise shiftable starter shaft mounted on and extending through said base-plate, a motor mounted on the outer face of the base-plate, and having driving connection with the starter shaft, a pinion on the end of said shaft at the inner face of the base-plate, a hollow casing extending outwardly from the base-plate, an oscillating lever pivotally supported within said hollow extension, said lever having operative connection with the starter shaft, a sliding plunger mounted in the outer end of said hollow extension, and projecting outside of the same, said plunger having at its inner end a cam surface adapted to act on said lever in the inward movement of the plunger, a spring applied to the said plunger to hold the same normally in its outward position, and a spring applied to said lever, and tending to hold the starter shaft in its retracted position and to maintain said lever in engagement with the cam surface of the plunger.

18. A starting device, comprising a base-plate, an endwise shiftable starter shaft mounted on and extending through said base-plate, an electric motor mounted on the outer face of the base-plate, and having its armature shaft in alinement with the starter shaft, a sliding coupling connecting the starter shaft with the motor shaft, a pinion on the inner end of said starter shaft, a hollow casing extending outwardly from the base-plate, an oscillating lever pivotally supported on the base-plate, with one of its arms extending into said hollow extension, said lever having operative connection with the starter shaft, a sliding plunger mounted in the outer end of said hollow extension, and projecting outside of the same, said plunger having at its inner end a cam surface adapted to act on said lever in the inward movement of the plunger, a spring applied to the said plunger to hold the same normally in its outward position, and a spring applied to said lever and tending to hold the starter shaft in its retracted position and to maintain said lever in engagement with the cam-surface of the plunger.

19. In a starting device, the combination with an engine fly-wheel provided with a gear-ring, of a base-plate arranged at an angle to the axis of the fly-wheel, an endwise shiftable starter shaft mounted on and extending through said base-plate, said base-plate having an inwardly extending bearing arm for the starter shaft, located at the end of the plate nearest the fly-wheel, a motor mounted on the outer face of the base-plate, at its end remote from the fly-wheel, and having driving connection with the starter shaft, a pinion on the end of said shaft adjacent to the fly-wheel, a hollow casing extending outwardly from the base-plate, an oscillating lever pivotally supported on the base-plate, said lever having operative connection with the starter shaft, a sliding plunger mounted in the outer end of said hollow casing, and projecting outside of the same, said plunger having at its inner end a cam surface adapted to act on said lever in the inward movement of the plunger, a spring applied to the said plunger to hold the same normally in its outward position, and a spring applied to said lever and tending to hold the starter shaft in its retracted position, and to maintain said lever in engagement with the cam surface of the plunger.

20. The combination with a fly-wheel provided with a gear-ring and a casing for said fly-wheel provided with a tapered section having an opening and a flat bearing surface surrounding said opening, of a starting device, comprising a base-plate adapted to fit at its side edges against the bearing surface which surrounds said opening, an endwise movable shaft mounted on said base-plate and extending through the same, a pinion on the inner end of said shaft, adapted to have intermeshing engagement with the said gear-ring, a motor mounted on the outer face of the base-plate, and having driving connection with the outer end of said starter shaft, and means for giving endwise shifting motion to said starter shaft.

21. In a starting device, the combination with an engine fly-wheel, and a casing surrounding the same and provided with a tapered section, having an aperture therein, of a base-plate secured at its margin to the tapered section of the casing, an endwise shiftable starter shaft mounted on said base-plate in a position parallel with the axis of the fly-wheel, a motor mounted on the outer face of the base-plate, and having driving connection with the outer end of the starter shaft, a pinion on the inner end of said shaft, a hollow casing extending outwardly from the base-plate, an oscillating lever pivotally supported on the base-plate, said lever having operative connection with the starter shaft, and being provided with an arm which extends into said hollow casing, a sliding plunger mounted in the outer end of said hollow casing, and projecting outside of the same, said plunger having at its inner end a cam surface adapted to act on said lever in the inward movement of the plunger, a spring applied to the said plunger to hold the same normally in its outward position, and a spring applied to said lever, and tending to hold the starter shaft in its retracted position and to maintain said lever in engagement with the cam surface of the plunger.

In testimony, that I, claim the foregoing as my invention I affix my signature in the presence of two witnesses, this 22nd day of May A. D. 1914.

EMERSON C. RUSSELL.

Witnesses:
CHARLES H. POOLE,
EUGENE C. WANN.

Copies of this patent may be obtained for five cents each, by addressing the "Commissioner of Patents, Washington, D. C."